(12) United States Patent
Murray et al.

(10) Patent No.: US 10,805,404 B2
(45) Date of Patent: Oct. 13, 2020

(54) MANAGING REMOTE SUPPORT

(71) Applicant: VMware, Inc., Palo Alto, CA (US)

(72) Inventors: Kevin Murray, Broomfield, CO (US); Nicholas Boncek, Strongsville, OH (US); Raghu Mummadi, Alpharetta, GA (US); Perron Jones, Atlanta, GA (US); Brian Mgbeokwere, Atlanta, GA (US); Gustavo Trelles, Cumming, GA (US)

(73) Assignee: VMWARE, INC., Palo Alto, CA (US)

( * ) Notice: Subject to any disclaimer, the term of this patent is extended or adjusted under 35 U.S.C. 154(b) by 118 days.

(21) Appl. No.: 15/855,322

(22) Filed: Dec. 27, 2017

(65) Prior Publication Data
US 2019/0199803 A1 Jun. 27, 2019

(51) Int. Cl.
| | | |
|---|---|---|
| H04L 29/08 | (2006.01) | |
| H04L 12/24 | (2006.01) | |
| H04L 29/06 | (2006.01) | |
| G06F 8/60 | (2018.01) | |
| G06F 8/61 | (2018.01) | |

(52) U.S. Cl.
CPC .............. *H04L 67/141* (2013.01); *G06F 8/60* (2013.01); *H04L 41/046* (2013.01); *H04L 67/025* (2013.01); *H04L 67/08* (2013.01); *H04L 67/38* (2013.01); *G06F 8/61* (2013.01); *H04L 63/0272* (2013.01); *H04L 63/0823* (2013.01)

(58) Field of Classification Search
CPC ..... H04L 67/141; H04L 67/25; H04L 41/046; H04L 63/0272; H04L 63/0823; G06F 8/61
See application file for complete search history.

(56) References Cited

U.S. PATENT DOCUMENTS

| | | | | |
|---|---|---|---|---|
| 9,686,323 B1* | 6/2017 | Helter | .................. | H04L 65/1066 |
| 10,278,040 B2* | 4/2019 | Hamilton | .............. | H04L 67/025 |
| 2001/0047406 A1* | 11/2001 | Araujo | ..................... | H04L 29/06 |
| | | | | 709/223 |
| 2007/0294368 A1* | 12/2007 | Bomgaars | ............... | H04L 41/22 |
| | | | | 709/217 |
| 2013/0060869 A1* | 3/2013 | Davis | ................... | G06Q 10/107 |
| | | | | 709/206 |
| 2013/0103841 A1* | 4/2013 | Werth | ..................... | H04L 67/34 |
| | | | | 709/227 |
| 2014/0115676 A1* | 4/2014 | Coghlan | ............... | H04W 12/06 |
| | | | | 726/6 |
| 2016/0029216 A1* | 1/2016 | Gonsalves | ............ | H04W 76/10 |
| | | | | 455/411 |
| 2016/0321050 A1* | 11/2016 | Compton | ........... | G06Q 30/0209 |
| 2016/0359632 A1* | 12/2016 | Mohajeri | ............ | H04L 63/0421 |
| 2017/0070403 A1* | 3/2017 | Sugaya | ................ | H04L 41/0806 |

(Continued)

*Primary Examiner* — Blake J Rubin
(74) *Attorney, Agent, or Firm* — Thomas Horstemeyer, LLP

(57) ABSTRACT

Disclosed are examples relating to managing remote support sessions using devices in communication through a network. In some examples, a request to initiate a remote support session is obtained. The request includes a selection of an endpoint. A determination of the remoting capability of the endpoint is performed. A remote support server is selected. Progress of initiation of a remote support session is rendered in a user interface. A user interface element is rendered within the user interface. The user interface element allows launching of a remote support session.

20 Claims, 6 Drawing Sheets

(56) References Cited

U.S. PATENT DOCUMENTS

| | | | |
|---|---|---|---|
| 2017/0091779 A1* | 3/2017 | Johnson | G06Q 30/016 |
| 2017/0220330 A1* | 8/2017 | Soini | G06F 8/61 |
| 2017/0359723 A1* | 12/2017 | Pal | H04L 63/0853 |
| 2018/0146046 A1* | 5/2018 | Deane | H04L 63/20 |

* cited by examiner

MANAGING REMOTE SUPPORT

BACKGROUND

Support systems often allow administrators to perform support on mobile devices for various reasons. For example, it is common for an administrator to use a support system to conduct a remote support session to use mobile device features available through a remoting capability of the mobile device. Administrators can in this way conduct multiple remote support sessions using various remoting capabilities of various mobile devices.

Sometimes, support systems are only capable of establishing remote support sessions based on certain remoting capabilities. In other situations, support systems are limited by constraints regarding remoting capabilities. The remoting capabilities of a device can also depend on numerous other factors such as device manufacturer, make/model of the device, applications or other content installed on the device, and the like. As such, as the number and type of mobile devices supported grows, the difficulty in using a support system to conduct a remote support session can be magnified.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
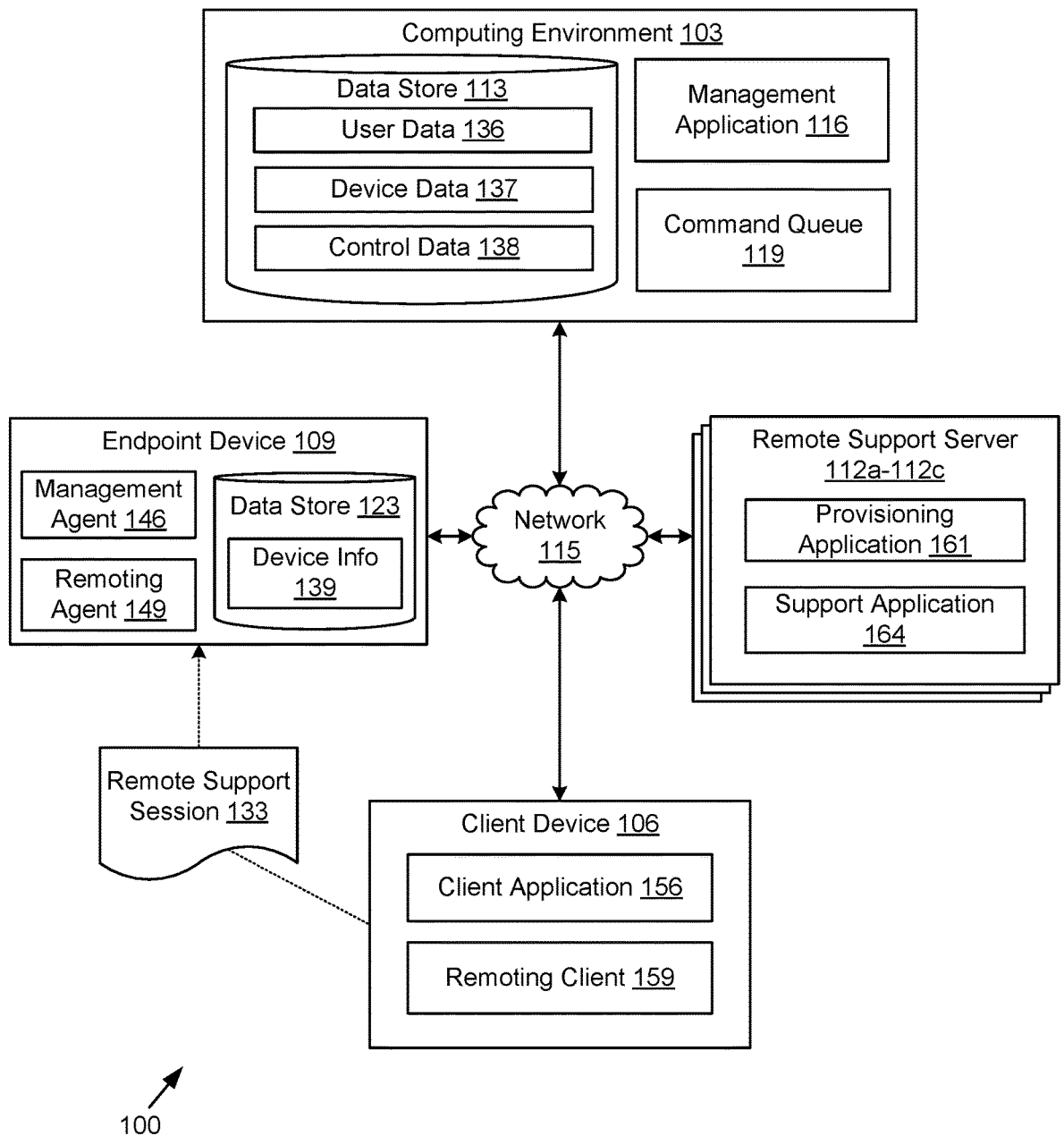
FIG. 1 is a drawing of an example of a networked environment.

The present disclosure relates to managing support systems for remote support in diverse mobile device environments, such as in environments where mobile devices have various remoting capabilities and remoting constraints. In particular, examples of this disclosure are related to systems and methods that can perform processes to allow a remote support session to be initiated, and to cause various devices to communicate with a remote support server to participate in the remote support session.

Support systems can require different processes to initiate (or establish) remote support sessions. A remote support session can be established between a client device and an endpoint device. A client device can allow an administrator to utilize features of a management application and to perform remote support once a remote support session has been established. In this context, an endpoint device is a device on which remote support is to be performed. Endpoint devices can be desktop computers, mobile phones, laptops, tablets, or other devices. In some examples, the systems described herein facilitate a remote support session between a client device and an endpoint device.

To establish a remote support session between a client device and an endpoint device, a remote support server can be used. Remote support servers are remote management systems, remote desktop systems, remote desktop servers, or remote control systems. Different remote support servers can have different configurations. For example, some remote support servers have support for remoting capabilities of desktop computers while other remote support servers have support for mobile devices. In some cases, remoting capabilities may be related to operating systems such as MICROSOFT® WINDOWS®, macOS®, ANDROID®, IOS®, BLACKBERRY®, or WINDOWS MOBILE®. Several examples of remote support servers that can create remote sessions for mobile devices include AETHERPAL®, BOMGAR®, LOGMEIN®, MOTIVE®, and TEAMVIEWER®.

In the context of establishing a remote support session, remote support servers can require that certain processes be followed or certain constraints be satisfied prior to (or at the same time as) establishing a remote support session to a particular endpoint device. For example, a remote support server can require an endpoint device be registered with the remote support server. Remote support servers can additionally require that a remoting agent be installed on the particular endpoint device. One example of the functionality of a remoting agent is to communicate with a remote support server such that an administrator using a client device can perform remote support on an endpoint device. Regarding other processes or constraints, remote support servers can require control data be received before establishing a remote support session.

Additionally, different endpoint devices can require different control data in order for the different endpoint devices to communicate with a remote support server and initiate (or establish) a remote support session. Control data in this context could include a unique device identifier (UDID) to identify the endpoint device to the remote support server, or a hostname to identify the network address for the remote support server so the endpoint device can communicate with the remote support server at a protocol level.

In certain embodiments, the systems described herein facilitate initiating (or establishing) a remote support session. To facilitate a remote support session in this context means to perform processes to allow a remote support session to be created and to cause various devices to communicate with a remote support server. In one example, a remote support server that is compatible with an endpoint device is selected, and a communication between the endpoint device and the remote support server occurs. Additionally, certain examples cause a communication between a client device and a remote support server. As such, the present disclosure relates to managing support systems for remote support in diverse mobile device environments, including remote support sessions between a client device, an endpoint device, and a remote support server.

Because endpoint devices and remote support servers can require different control data to initiate a remote support session, conducting a remote support session on a variety of endpoint devices and using a variety of remote support servers can be a cumbersome process for an administrator. Therefore, examples of this disclosure allow an administrator to use a management application to conduct a remote support session. In this way, examples described herein can initiate a remote support session between a client device, a remote support server, and an endpoint device. In the following discussion, examples of systems and their components are described, followed by examples of the operation of those systems.

Beginning with FIG. 1, shown is an example of a networked environment 100. The networked environment 100 includes a computing environment 103, a client device 106, and an endpoint device 109. The networked environment 100 can also include remote support servers 112a-112c, referred herein as remote support server 112. All of these devices can be in data communication through network 115. The network 115 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., BLUETOOTH® networks, microwave transmission networks, as well as other networks relying on radio broadcasts. The network 115 can also include a combination of two or more networks 115. Examples of networks 115 can include the internet, intranets, extranets, virtual private networks (VPNs), and similar networks.

The computing environment 103 can be computing systems that are operated by one or more enterprises, such as businesses or other organizations. The computing environment 103 can include computing devices, such as a server computer, that provides computing capabilities. Alternatively, the computing environment 103 can include multiple computing devices arranged in one or more server banks or computer banks. For examples in which the computing environment 103 includes multiple computing devices, the computing devices can be located in a single installation, or the computing devices can be distributed among multiple different geographical locations.

In some examples, the computing environment 103 can include computing devices that together form a hosted computing resource or a grid computing resource. In other examples, the computing environment 103 can operate as an elastic computing resource for which the allotted capacity of computing-related resources, such as processing resources, network resources, and storage resources, vary over time. In other examples, the computing environment 103 can include or be operated as one or more virtualized computer instances that can be executed in order to perform the functionality that is described herein. As such, computing environment 103 can be representative of a computing environment that operates in an on-premises mode, or in a software-as-a-service mode, or both.

Various applications or other functionality can be executed in the computing environment 103 according to various embodiments. The components executed on the computing environment 103, for example, can include a management application 116, and other applications, services, processes, systems, engines, or functionality not discussed in detail herein. The management application 116 can perform various functions, including to initiate remote support sessions, such as remote support session 133, between computing devices, such as a client device 106 and an endpoint device 109.

In one example, a management application 116 can obtain a request to initiate a remote support session 133. The request can include a selection of an endpoint device 109. An endpoint device 109 can include a processor-based computer system, such as a desktop computer, a laptop computer, a personal digital assistant, a mobile phone, a tablet computer, or other devices. The endpoint device 109 can include a management agent 146, a remoting agent 149, and a data store 123.

The management application 116 can also determine a remoting capability of the endpoint device 109. An endpoint device 109 should for example be capable of connecting to a remote support server 112. In some cases a remoting capability can be based on device info 139 or other data stored in the data store 123 of endpoint device 109. Device info 139 can include a unique device identifier (UDID), which identifies an endpoint device 109 that is enrolled with the management application 116 as a managed device. Device info 139 can also include a serial number, a hardware identification number, a media access control (MAC) address, or an International Mobile Equipment Identity (IMEI) number of a network card.

Additionally, management application 116 can determine the remoting capability by obtaining a sample from the endpoint device 109. The sample can be a remoting agent status, a geographical location, a network connection status, a Unique Device Identifier (UDID), or other device identifier. The sample is in some cases obtained by a management agent 146 on endpoint device 109 and sent to the management application 116 so that management application 116 can determine the remoting capabilities of the endpoint device 109. As a result, the management application 116 obtains a variety of data regarding the remoting capabilities of the endpoint device 109. The management application 116 can use this and other data to select a remote support server 112 that is capable of creating a remote support session 133 for an endpoint device 109.

As an example, the management application 116 can select which remote support server 112 from the remote support servers 112a-112c should be used to establish a remote support session between client device 106 and endpoint device 109. Because an endpoint device 109 can have different operating systems, configurations, constraints, or capabilities, one of remote support servers 112a-112c may not be able to generate a remote support session 133 between a client device 106 and an endpoint device 109. It is also possible that a particular remote support server 112a-112c may not be compatible with a remote support session 133. So, the management application 116 can select one remote support server 112 from the remote support servers 112a-112c. The remote support server 112 can for example be selected based on the remoting capability of the endpoint device 109. In addition, the remote support server 112 can be selected based on a product authorization stored in data store 113.

The management application 116 can perform various functionality related to determining eligibility of endpoint devices to access remote support sessions, initiating remote support sessions, installation of remoting agents, configuration of remoting agents, causing execution of remoting agents, and other activities. Management application 116 may perform this functionality by making application programming interfaces (APIs) calls to various devices or servers, such as remote support server 112. API calls can be implemented as a Representational State Transfer (REST) API using a JavaScript Object Notation (JSON) object payload over hypertext transfer protocol (HTTP/HTTPS).

A remote support server 112 can include functionality, including one or more APIs, or other applications, services, processes, systems, engines, or functionality not discussed in detail herein. This functionality can be represented as a logical grouping of APIs or as separate systems embodied within a remote support server 112. As an example of these representations, the disclosure herein refers to a provisioning application 161 that provides provisioning features including receiving endpoint device registration, and a support application 164 that provides support features. Hence, a logical grouping of functionality as a provisioning application 161 and a support application 164 would be optional for allowing a remote support session to be initiated. Other functionality could be used, including remote support server 112, without departing from the scope of the present disclosure. Note that any such logical grouping is entirely illustrative and, accordingly, certain embodiments do not make use of this logical grouping in order to achieve the operations discussed herein.

Management application 116 can obtain from remote support server 112 an eligibility status of endpoint device 109, including by making one or more API calls (as described above). In this context eligibility status means whether remote support server 112 is configured for remote support of the endpoint device 109. In one example, management application 116 can make an API call to provisioning application 161 on remote support server 112 providing to the provisioning application 161 the Unique Device Identifier (UDID) of endpoint device 109. The API call can be a Device Eligibility API call. The provisioning application 161 can determine whether the UDID of endpoint device 109 is registered with a particular remote support server 112, and then the provisioning application 161 can reply with a response to management application 116 with an indication of the eligibility of the endpoint device 109 to have remote support performed. Management application 116 can then use the result of obtaining eligibility status of an endpoint to select a particular remote support server 112 to be the source of the remote support session 133. In other examples, management application 116 can select remote support server 112 based on information stored in the data store 113 and then perform an API call to the remote support server 112 to determine eligibility of endpoint device 109.

In some examples, the management application 116 can cause a remote support session 133 to be created, including by selecting a remote support server 112 and making one or more API calls to the remote support server 112. Management application 116 can also cause endpoint device 109 to communicate with the remote support server 112 and access the remote support session 133. In some other examples, the management application 116 can cause a client device 106 to communicate with the remote support server 112 and access the remote support session 133. In this way, examples described herein can cause a remote support session 133 to be created and cause various devices to communicate with a remote support server and facilitate a remote support session 133 between a client device 106 and an endpoint device 109.

The management application 116 can cause a remoting agent 149 to be executed by an endpoint device 109. The remoting agent 149 can be an application or service that allows an endpoint device 109 to communicate with a remote support server 112 and access a remote support session 133. In one implementation, the remoting agent 149 can be an AETHERPAL®, BOMGAR®, or LOGMEIN® client, which are remote support software clients that work in conjunction with a remote support server. In examples of this disclosure, the remoting agent 149 can work in tandem with the remote support server 112 to allow a client device 106 to perform remote support on endpoint device 109. In some implementations, a remoting agent may be required to communicate with remote support server. For example, an AETHERPAL® remoting agent can be required to communicate with a remote support server 112 running AETHERPAL® software. The management application 116 can determine if a remoting agent 149 is required in order for endpoint device 109 to communicate with a remote support server 112 and access a remote support session 133.

As an example, management application 116 can determine that a remoting agent 149 is required. Then, based on that determination, the management application 116 can cause the remoting agent 149 to be executed on endpoint device 109. In one example, the computing environment 103 can include a command queue 119 that is associated with an endpoint device 109. The command queue 119 can represent a module or functionality of the management application 116. The command queue 119 can store one or more commands that can be performed on an endpoint device 109.

In some cases, a management agent 146 can perform the commands on the endpoint device 109. The management agent 146 can periodically query the command queue 119 to determine whether the management application 116 has instructed the management agent 146 to take any actions upon an endpoint device 109. In some examples, a push notification can be sent to the endpoint device 109 that causes the endpoint device 109 to query the command queue 119. In some examples, rather than maintaining a command queue 119 in the computing environment 103, commands from the management application 116 can be pushed or otherwise transmitted to the endpoint device 109.

In one example, the management application 116 can place a command in a command queue 119 associated with an endpoint device 109 that, when retrieved and executed by the endpoint device 109, causes the endpoint device 109 to execute a remoting agent 149. In another example, the management application 116 can place a command in a command queue 119 associated with an endpoint device 109 that causes the endpoint device 109 to download a particular remoting agent 149 and install it upon the endpoint device 109 using specified configuration settings.

The endpoint device 109 can execute commands that cause an agent to be executed, cause an agent to be installed, and/or to configure one or more agents. As mentioned earlier, the endpoint device 109 can execute a management agent 146. The management agent 146 can execute commands on the endpoint device 109. The management agent 146 can be an application or service that can communicate with the management application 116 to administer the endpoint device 109. The management agent 146 can be installed with elevated or administrative privileges and install remoting agents, verify configuration of remoting agents, install configuration files, cause remoting agents to be executed, or perform other actions to administer the endpoint device 109 on behalf of the management application 116. In the context of this disclosure, the management agent 146 can facilitate the installation of remoting agent 149 on the endpoint device 109 on behalf of the management application 116. The management agent 146 can also cause a remoting agent 149 to be executed on the endpoint device 109.

Management agent 146 can obtain messages and/or commands from command queue 119 to determine whether management application 116 has requested one or more actions to be performed against endpoint device 109. To this end, the management agent 146 can periodically query the command queue 119 to determine whether the management application 116 has instructed the management agent 146 to take any actions upon an endpoint device 109.

As an example of causing a remoting agent to be executed, the management application 116 can issue a command causing the endpoint device 109 to execute a remoting agent 149 using particular configuration settings or configuration commands. The command provides the remoting agent 149 with information that allows a remote support session 133 between the endpoint device 109 and the remote support server 112. The command can be a ThirdPartyRemoteManagement command, a RemoteManagement command, or other command.

Management application 116 can also provide a message to the endpoint device 109. The message causes the management agent 146 to retrieve the command from the command queue 119 and to execute the command. In some cases, the message is an AirWatch Cloud Messaging (AWCM) message, a ThirdPartyMessaging message, or other message. The message causes the management agent 146 to retrieve the command from the command queue 119 and to execute the command. The management agent 146 can cause remoting agent 149 to be executed on endpoint device 109. The command causes the remoting agent 149 to communicate with a support application 164 on the remote support server 112, allowing a remote support session to be initiated between the endpoint device 109 and the remote support server 112.

As such, the management application 116 can use command queue 119 and the management agent 146 to cause the remoting agent 149 to communicate with the remote support server 112 for a remote support session on the endpoint device 109. In parallel, management application 116 can cause a client device 106 to communicate with a remote support server 112. The client device 106 can include a processor-based computer system, such as a desktop computer, a laptop computer, a personal digital assistant, a mobile phone, or a tablet computer. The client device 106 can also include output devices, such as a display and audio speakers, as well as one or more input devices, such as a mouse, keyboard, touch pad, or touch screen, which facilitate a user interacting with and controlling the client device 106.

The client device 106 can also execute a client application 156. In one example, a user on client device 106 can use client application 156 to navigate to a page rendered by management application 116. A user can create a request to initiate a remote support session by selecting endpoint device 109 from a list of endpoint devices in a user interface. In some embodiments, client application 156 can be a web browser.

As another example, management application 116 can make an API call to support application 164 using API request parameters that cause support application 164 to return control data about a remote support session 133. In some cases the API call is a StartSession API call. Support application 164 can, after verifying it has all the request parameters, return a uniform resource locator (URL), control data, or other types of data as a response. Upon receiving a response, management application 116 can cause client device 106, or client application 156 to open a new tab with this URL and communication between the client device 106 and the remote support server 112. In some examples, management application 116 can cause client device 106 to use control data to establish a communication between the client device 106 and the remote support server 112, where control data can be a host name and/or a port number, for example. The client application 156 can in these ways communicate with a remote support server 112 and initiate a remote support session 133 on endpoint device 109.

In other embodiments, the client device 106 can include a remoting client 159. An example of a remoting client could be a web browser, a remoting client such as VNC, MICROSOFT® WINDOWS® REMOTE DESKTOP VIEWER, JAVA®, JAVASCRIPT®, or any other remoting client. The remoting client 159 can communicate with a remote support server 112 and can initiate a remote support session 133 to endpoint device 109. Upon receiving the control data, management application 116 can cause remoting client 159 to connect to remote support server 112 using the control data.

In addition to causing a communication to be established between the client device 106 and the remote support server 112, management application 116 would also have caused a communication to be established between the endpoint device 109 and the remote support server 112. A user on client device 106 can now conduct a remote support session 133 on endpoint device 109. In this way, examples are shown that initiate a remote support session between client device 106, endpoint device 109, and remote support server 112.

The management application 116 can also perform functionality related to installation, configuration, and other associated activities. In some examples, a remoting agent 149 may not be present on an endpoint device 109. The command queue 119 can transmit commands to an endpoint device 109 to install a remoting agent 149 using particular configuration settings. The command queue 119 can in this way install and configure a remoting agent on an endpoint device 109.

For example, the management application 116 can cause remoting agent 149 to be installed on endpoint device 109. The management application 116 can place a command in a command queue 119 associated with an endpoint device 109 or in some cases associated with a management agent 146 running on the endpoint device 109. In one example, the management application 116 can place a command in a command queue 119 associated with an endpoint device 109 that, when retrieved and executed by the endpoint device 109, causes the endpoint device 109 to download a particular remoting agent 149 and install it upon the endpoint device 109 using specified configuration settings.

In this way, the management application 116 can cause client device 106 to access the endpoint device 109 through the remote support server 112 using a remoting agent 149. Access can include initiating a remote support session 133, or a portion of a remote support session 133, through the network 115.

A management application 116 can also de-provision an endpoint device 109, including from a remote support server 112. De-provision in this context means at least to remove device details about an endpoint device 109 from a remote support server 112, or to uninstall a remoting agent 149 from the endpoint device 109. The management application 116 can remove device details for an endpoint device 109 from a remote support server 112 by making API calls to the remote support server 112 or the provisioning application 161 running on remote support server 112. In the case of uninstalling a remoting agent 149, management application 116 can place a command in a command queue 119 associated with an endpoint device 109 that, when retrieved and executed by the endpoint device 109, causes the endpoint device 109 to uninstall a remoting agent 149. Additionally, the de-provisioning could include un-enrollment of a device from a mobile device management service to perform a delete device functionality or to perform an enterprise wipe or a device wipe functionality. To de-provision the device from the remote support server 112, management application 116 can make a DeleteDevice API call to provisioning application 161.

In other cases, the management application 116 can include a T10 interface. The T10 interface defines an integration portal between the computing environment 103 and the remote support server 112. The T10 interface can use Representational State Transfer (REST) communication with a JavaScript Object Notation (JSON) object payload. The T10 interface allows, among other things, the management application 116 to make an API call to a remote support server 112 to determine eligibility for an endpoint device 109 to access a remote support session 133. The T10 interface can also start a remote support session using a remoting agent 149 and make API calls to provisioning application 161 on the remote support server 112 to delete an endpoint device 109 from a remote support server 112.

Next, examples are described of the client device 106 using the management application 116 to initiate a remote support session 133 between client device 106 and endpoint device 109. The management application 116 can display various user interfaces. A user can use the client application 156 to interact with one or more user interfaces generated by management application 116. In some cases, a user will interact with these user interfaces to input configuration information about remote support servers. The user can in this way input configuration information such as hostname, port, user mapping, and role mapping.

In some other cases, a user can use client application 156 to navigate to a page rendered by management application 116. As such, a user can utilize the client application 156 to create a request to initiate a remote support session by selecting endpoint device 109 from a list of endpoint devices. The management application 116 receives the request, as described herein. In this way, a user on client device 106 can use the management application 116 to conduct a remote support session 133 on an endpoint device 109.

Returning now to computing environment 103, various data is stored in a data store 113 that is accessible to the computing environment 103. The data stored in the data store 113 is associated with the operation of the management application 116 and potentially other applications or functional entities described herein. This data can include user data 136, device data 137, control data 138, and potentially other data.

In some cases, the data store 113 can include information about users of the enterprise in user data 136. User accounts can be associated with certain endpoint devices that are supported with the management application 116. User accounts can also be associated with a particular endpoint device, for example, so that the user account is linked with endpoint device 109. In one scenario, a user can enroll an endpoint device 109 with the management application 116 by providing his or her credentials to the management application 116. Upon authenticating the user with the management application 116, the management application 116 can remotely control the endpoint device by communicating with the management agent 146, which can act on the endpoint device 109 to perform various deployment and installation tasks related to remote support sessions, including installing and executing remoting agent 149. To this end, user data 136 can identify a user associated with an endpoint device using a user identifier. Additionally, user data 136 can identify a user associated with a client device 106.

The data store can also include device data, for example, for the endpoint device 109. A device data 137 can include a device identifier, such as a unique device identifier (UDID), which identifies an endpoint device 109 that is enrolled in a mobile device management service, and/or that identifies an endpoint device 109 that is available for remote support sessions. The device identifiers can include a serial number, a hardware identification number, a media access control (MAC) address or International Mobile Equipment Identity (IMEI) number of a network card installed on the endpoint device 109, or other attribute that uniquely identifies an endpoint device 109 from other endpoint devices that may be in communication with management application 116. The device data 137, in some implementations, can identify one or more applications such as the management agent 146 and the remoting agent 149, corresponding to endpoint device 109.

Referring now to remote support server 112, the remote support server 112 is representative of multiple remote support servers that can be coupled to the network 115. The remote support server 112 can execute various applications such as a provisioning application 161 and a support application 164. A management application 116 can communicate with provisioning application 161 and make API calls to provisioning application 161 to perform various provisioning tasks. For example, a management application 116 could call provisioning application 161 to determine the eligibility status of an endpoint device 109 based on a registration (or nonregistration) by an endpoint device 109 with the remote support server 112. Also, a management application 116 can make an API call to support application 164 to initiate one or more remote support sessions 133. A remote support server 112 can in some circumstances contain one of a provisioning application 161 or a support application 164 but not the other. In these cases, the support application can perform the functionality of the provisioning application, and vice-versa. As such, provisioning application 161 and support application 164 can be representative of functionality provided by a remote support server 112, including other applications, services, processes, systems, engines, or functionality not discussed in detail herein.

Management application 116 can operate in various modes, including an on-premises mode and/or in a software-as-a-service computing environment. Operation in an on-premises mode can be different from operation in a software-as-a-service mode. For example, a provisioning functionality can be different. Some features of the computing environment 103 can facilitate correct service distribution and/or provisioning in either an on-premises mode or a software-as-a-service mode.

For example, in a software-as-a-service mode, a provisioning action can be as follows. Control data 138 can include one or more root and/or intermediate certificates (e.g., certificates used to secure API calls). Management application 116 can send a public key certificate to a remote support server 112. Management application 116 can also seed certificates in control data 138 by executing a script across various users and devices associated with the software-as-a-service mode. Seeding in this context means to update blank values in the data store to reflect a particular root and/or intermediate certificates used to secure API calls. In some embodiments, control data 138 may be related to an enterprise purchasing a particular product configuration or stock-keeping unit (SKU), the enterprise being associated with an endpoint device 109. Management application 116 provides a feature where a user on client device 106 can request that the SKU be provisioned in the software-as-a-service mode and a product authorization be stored in data store 113. Management application 116 can then create a child certificate and enable a flag for remote support server 112. The child certificate is used to secure API calls to remote support server 112 that management application 116 performs on behalf of users associated with an enterprise (or tenant). Management application 116 uses the flag to determine access for users associated with the enterprise (or tenant) to perform remote support using remote support server 112. Additionally, management application 116 provides a feature where a user on client device 106 associated with an enterprise can enroll endpoint device 109 in a mobile device management service. Management application 116 can then provision a remoting agent 149 to the endpoint device 109.

For example, the management application 116 can place a command in a command queue 119 associated with an endpoint device 109, or in some cases associated with a management agent 146 running on the endpoint device 109. In one example, the management application 116 can place a command in a command queue 119 associated with an endpoint device 109 that, when retrieved and executed by the endpoint device 109, causes the endpoint device 109 to download a particular remoting agent 149 and install it upon the endpoint device 109 using specified configuration settings. Upon initiating a remote support session, endpoint device 109, or in some cases a management agent 146, can call an API on provisioning application 161 to register endpoint device 109 with remote support server 112.

In an on-premises mode, a provisioning action can be as follows. To begin, a customer can purchase a SKU. A Common Name (CN) tool can be provided within computing environment 103 that can connect to a customer database and create a JavaScript Object Notation (JSON) object. Next, the JSON object can be loaded into a certificate tool to generate a client certificate. Management application 116 can use a client certificate to provide REST API certificate-based authentication for an enterprise (or tenant). For example, use of a client certificate can secure communications from the management application 116 to endpoint devices. The client certificate can then be loaded back into the CN tool and be used by the CN tool to seed data into the data store 113. Next, the certificate public keys can be added into the remote support server 112 by a call to an API on remote support server 112, provisioning application 161 or support application 164. Also, management application 116 provides a feature to allow the customer to enroll the endpoint device 109 into a mobile device management service.

Management application 116 can then provision a management agent 146 and/or a remoting agent 149 to endpoint device 109. For example, the management application 116 can cause the remoting agent 149 to be installed on endpoint device 109. The management application 116 can place a command in a command queue 119 associated with an endpoint device 109, or in some cases associated with a management agent 146 running on the endpoint device 109. In one example, the management application 116 can place a command in a command queue 119 associated with an endpoint device 109, that when retrieved and executed by the endpoint device 109, causes the endpoint device 109 to download a particular remoting agent 149 and install it upon the endpoint device 109 using specified configuration settings. Another command, when executed, can cause the endpoint device 109 to register the endpoint device 109 with remote support server 112.

The management application 116 can also verify control data to determine the management application 116 is ready. For example, the management application 116 should be ready to communicate with a remote support server 112 and to cause various devices to communicate with the remote support server 112. The management application 116 can access data store 113 containing control data 138 associated with remote support server 112. Control data 138 can include a host name (or an internet protocol address) and at least one certificate. A host name and at least one certificate can allow the management application 116 to communicate with a remote support server 112 at the host name using API calls secured by the certificate. Control data 138 can also include other data, for example, data to cause a remote support server 112 to initiate a remote support session 133. Data to initiate a remote support session 133 can include a host name alias (or friendly name), a status of a remote support server, a role, a locale, and a Common Name. As a result, management application 116 can easily cause a remote support session 133 communication between a client device 106 and an endpoint device 109.

Management application 116 can also maintain configuration settings including configuration parameters that depend on a remote support server 112. In this way, management application 116 can support distinct hostname(s) that allow management application 116, and other systems, applications, and devices, to make API calls to one or more remote support server 112. In some embodiments, the provisioning application 161 and the support application 164 can be on different machines or using different hostnames.

As an example, management application 116 can render one or more pages to allow a user to enter configuration details to allow a client device 106 to connect to endpoint device 109 through remote support server 112. Configuration details can include a console connection hostname and a device connection hostname. The console connection hostname can be for example any URL:port combination, and/or other control data for a remote support server 112. The device connection hostname can be another (or the same) URL:port combination, and/or other control data for a remote support server 112.

Since different remote support servers 112 can have different configurations, the management application 116 can render different user interface fields depending on the remote support server 112. Additionally, one or more API names and API values can be edited. As an example, for a first remote support server a RMCPUrlPlaceholder could equal "Device Connection Hostname", RMAnchorUrlPlaceholder="Console Connection Hostname", RMCPHostName="https://example1.server1.com:8888", and RMHostName="https://example1.server1.com:8080". For a second remote support server, a RMCPUrlPlaceholder could equal "Device Connection Hostname", RMAnchorUrlPlaceholder="Console Connection Hostname", RMCPHostName="https://example2.server2.com:8888", and RMHostName="https://example2.server2.com:8080"

In some embodiments, the management application 116 can render a user interface that allows a hostname and an https port to be input. Thus, for certain examples, the hostname to access a support application 164 on a remote support server 112 can be rms.allwatchrev.com. The https port to access a support application 164 on a remote support server 112 can be 443.

The management application 116 can also render user interfaces related to managing processes, including related to various steps associated with initiating a remote support session. Management application 116 can render a user interface that shows a progress bar and text. Management application 116 can for example render a user interface that represents a progress of registering an endpoint device 109 with a remote support server 112, providing client control data to a client device 106, and providing endpoint control data to an endpoint device 109. For example, if a user selects a "Register Device" button, the management application 116 can store a register command in a command queue 119 and close the window with a validation message in a Device Details page element that says "Register command queued. Please retry in a few minutes."

Management application 116 can render a user interface element within the user interface that represents the progress of initiating a remote support session 133. In the user interface element, a progress can be shown as a progress bar with accompanying text. The user interface element can be a progress bar, for example, or more specifically, a progress bar titled "Remote Management AWCM Progress Bar." Upon launching a remote support session 133, the user interface can show a modal with the progress steps to indicate a command is being sent out. A modal in this context means a window that forces an administrator on a client device 106 to interact with the window before the administrator can go back to using the management application 116. The progress bar can display for a period of time while a process is performed in the background. There is also a timeout for this process on the remote support server side that is configurable.

Next, management application 116 can check registration of an endpoint device with a provisioning application 161. At this point, the user interface element can display the text "Checking Device Registration". A management application can also send a command to start the remote support session, for example an AWCM command. At this point, the user interface element can display a text of "Queuing Remote Management Command." The management application can also make an API call to a remote support server 112 that tells the remote support server 112 to create the remote support session 133 and receive a response from the remote support server 112 that includes a URL, or other control data, that would cause a client device 106 to communicate with the remote support server 112 allowing the remote support session 133 to be conducted. At this point, user interface element can display text "Creating Remote Management session."

Other text displayed in the user interface element can include text that represents the status of initiating a remote support session 133. A progress bar can show status of a "Checking Device Registration" with a status of "Failed." The status can be failed, passed, or any other status associated with interprocess communication and/or other components involved in a remote support session 133.

In certain embodiments, management application 116 can use mapping to initiate a remote support session. The management application 116 can in this way perform user and role mapping to implement processes for user authentication and user authorization between various computing environments or devices to simplify management of remote support and to maintain a record of who initiated a remote support session both for the remote support server 112 and the management application 116. A remote support server 112 may maintain a list of users and a list of roles separate from the management application 116. A remote support server 112 may require a user to be authenticated before a remote support session can be conducted. Additionally, a remote support server 112 may require certain session information to be maintained during a remote support session 133.

In one example, the management application 116 can create a session map based on the endpoint device 109 and the remote support server 112. The session map can be based on characteristics necessary to maintain an active remote support session, including characteristics across various levels of the Open Systems Interconnection model such as the session (including an HTTP/HTTPs session), presentation, and application levels. As such, various tokens and other data can be used as part of the session map. Management application 116 can also create a user map based on at least one of a user identifier, role identifier, setup CN, a location, UDID, CN, or a hostname/URL stored data store 113. Finally, management application 116 can cause client device 106 to open a connection to remote support server 112 based on at least one of the session map, the user map, and remoting control data.

As an example of a user map, the management application 116 can maintain a mapping to identify who initiated the remote support session both for the remote support server 112 and the management application 116. This data can be stored in user data 136. Management application 116 can store a user name in user data 136 so management application 116 has context of which administrator initiated a remote support session 133 even if a record is deleted from the management application 116. The management application 116 can generate a static Globally Unique Identified (GUID) and can maintain a mapping identifier to indicate a mapping from a static GUID to the user name for management application 116.

For example, user data 136 can include four data fields of "MappingID", "ThirdPartyRM UserID", "AirWatch UserID", and "AirWatch UserName" with corresponding data values of "1", "8f339672-c96e-4093-b815-0a88696b0061", "42", and "domain\adminname." The composition of these data values can be based on a static mapping, a dynamic mapping, an algorithmical mapping, or any other mapping. For example, a "domain\adminname" can be associated with a particular enterprise, data stored in a directory server, or other common methods used to store and reference domains and administrators (including one or more user identifiers of one or more users designated as an administrator for a particular enterprise). The management application 116 can send the GUID to the remote support server 112 as all of or some part of a StartSession API call. For example, with this functionality management application 116 can use one user id, such as an AirWatch UserID, for authenticating a user with management application 116, and another user id, such as ThirdPartyRM UserID, for authenticating a user with remote support server 112. By maintaining a mapping, such as MappingID, management application 116 can control processes of user authentication and user authorization and as such maintain a record of who initiated a remote support session from the remote support server 112 and the management application 116 side.

As an example of a role map, the management application 116 and remote support server 112 can have a pre-defined role mapping. An administrator can have restricted access based on a defined role associated with a remote support server 112. For example, an administrator can have a restricted access when the administrator initiates a remote support session 133 with an endpoint device 109. Management application 116 can use administrator roles inside of management application 116 to decide what level of access a user should have to initiate remote support sessions or to perform remote support using a remote support server 112. Thus, a user associated with a client device 106 can have a restricted access to use a remote support server 112 based on a restricted role within the management application 116.

As an example of role and role mapping information, user data 136 can include three data fields of "MappingID", "ManagementSystemRoleID", and "ThirdPartyRMRoleID" with corresponding data values of "1", "3", and "2." The composition of these data values can be based on a static mapping, a dynamic mapping, an algorithmical mapping, or any other mapping. For example, a ManagementSystemRoleID of "3" can correspond to a role id of an Administrator in the management application 116. A ThirdPartyRMRoleID of "2" can correspond with an administrator (sometimes, an "RD Admin") for a remote support server 112. In this way, management application 116 can perform role mapping and provide role mapping information as part of a StartSession API call. Management application 116 can use role mapping information to send role information to a remote support server 112 as part of one or more StartSession API calls.

Referring again to computing environment 103 operating in an on-premises mode or in a software-as-a-service mode, management application 116 can perform a provisioning action that includes one or more actions to enhance security, including public-private key encryption actions using Common Name certificates. Management application 116 can generate certificates, provision certificates, and use certificates to secure API calls to remote support server 112. In some embodiments, provisioning of a certificate is performed by management application 116. A management application 116 can for example render a user interface that includes a screen to show and manage certificates to secure API calls to remote support server 112. API calls could be made to provisioning application 161 or support application 164. The user interface could include functionality and user interface screens related to generating and renewing certificates, and clearing certificate information from the user interface.

In certain embodiments, a CN tool is utilized to create JSON objects and certificates that secure communications from the management application 116 to endpoint devices. For example, a deployment team can use a CN tool to connect to customer tables and/or databases in data store 113 and create a JSON object. The JSON object can then be loaded into a certificate tool to generate a client certificate for a particular enterprise (or tenant). Management application 116 can use a client certificate to provide REST API certificate-based authentication for an enterprise (or tenant). For example, use of a client certificate can secure communications from the management application 116 to endpoint devices. A client certificate can then be loaded back into the CN tool to seed into the data store 113, where management application 116 can access the client certificate and use the certificate to secure communications from the management application 116 to an endpoint device 109. Seeding in this context refers to updating blank values in the data store to reflect a particular customer's client certificate. In some cases, no scripts are needed for provisioning certificates into the data store 113.

In other embodiments, computing environment 103 includes a certificate provisioning tool. A certificate provisioning tool can be used to create root and intermediate signing certificates for API authentication with a remote support server 112. In this context, management application 116 can authenticate API calls to secure communications from the management application 116 to endpoint devices. The certificate provisioning tool can also include a script to seed these certificates into the computing environment 103, the data store 113, and/or the remote support server 112. Seeding in this context refers to updating blank values to reflect particular root and intermediate certificates.

The management application 116 can also manage settings for one or more remoting agent 149. For example, management application 116 can manage control data that allows a remoting agent 149 to connect with a remote support server 112. If control data 138 for a remote support server 112 exists in the data store 113, management application 116 can send the control data 138 including remote support server 112 configuration to the management agent 146 on the endpoint device 109. The management application 116 can also obtain this control data by rendering a user interface. The management application 116 can render an agent settings screen that contains one or more user interface elements that allows a user to input control data that a remoting agent 149 can use to contact a remote support server 112. In this way, connection information can be set by management application 116 at a global level by using a logical group known as Agent Settings. In one example, management application 116 can store this control data 138 by Agent Settings including a parameter name of RM1 Server Host URL and a parameter value of ThirdPartyRemoteManagementHostName. A parameter value can be a host name associated with a remote support server 112 for an endpoint device 109 to communicate with when a remote support session is initiated from the management application 116.

Management application 116 can also manage remote support settings for a particular enterprise (or tenant) using a logical group known as Environment Name. Managing remote support settings in this way allows management application 116 or remote support server 112 to put the endpoint device 109 in the correct enterprise (or tenant) group when endpoint device 109 reaches out to the remote support server 112 for registration. A parameter name can for example be "ThirdPartyRemoteManagementEnvironmentName." The parameter value for a ThirdPartyRemoteManagementEnvironmentName (or any Environment Name) can for example be the same as the CN of the client certificate for an enterprise (or tenant) to whom an endpoint device 109 belongs.

While the present disclosure discusses certain integration techniques such as REST, JSON, and HTTP, it can be understood that other internetworking, interoperability, and interprocess communication techniques can similarly be used. The computing environment 103 can thus comprise well-known techniques including middleware, object brokers, UDDI (Universal Description, Discovery and Integration), WSDL (Web Services Description Language), SOAP (Simple Object Access Protocol (SOAP), or the like. Regarding "securing," and "API calls," other techniques known in the art can similarly be used. For example, the securing of remote-device calls using certain encryption techniques other than public-private key encryption using client, intermediate, and root certificates is well known. In addition, the term "API calls" may be interchangeable with other types of calls, including stateless and/or stateful protocols.

Figure 2A:
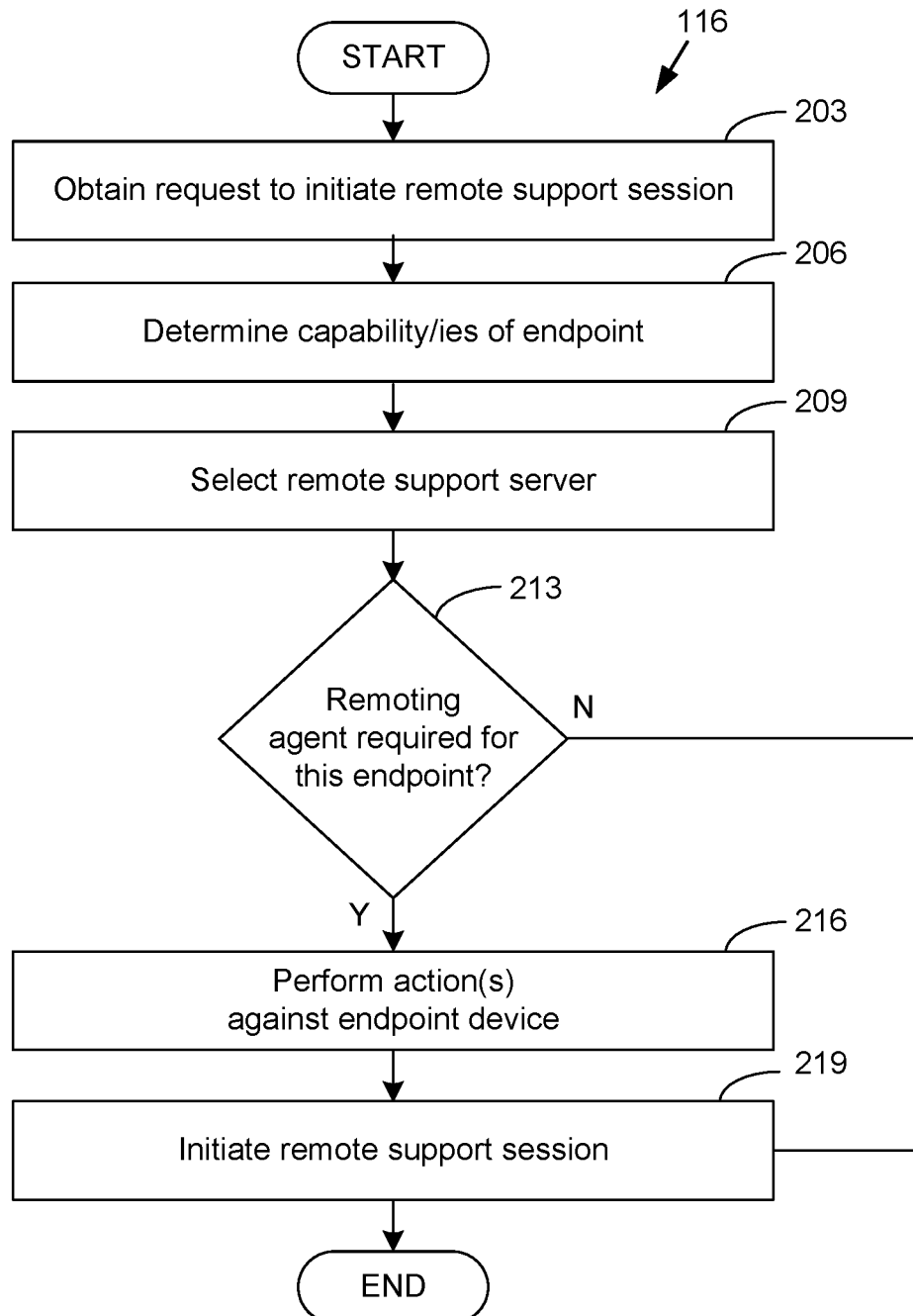
FIG. 2A is a flowchart illustrating examples of functionality implemented as portions of a management application executed in a computing environment in the networked environment of FIG. 1 according to various embodiments of the present disclosure.

With reference to FIG. 2A, shown is a flowchart that provides an example of a portion of the operation of the computing environment 103. In particular, FIG. 2A provides an example of the management application 116 facilitating a remote support session between an endpoint device 109 and a client device 106. Additionally, the flowchart of FIG. 2A can be viewed as depicting an example of steps of a method implemented in the management application 116.

Beginning with step 203, the management application 116 can obtain a request to initiate a remote support session from a client device 106. The request can also be obtained from a client application 156 running on the client device 106. The request can include selection of an endpoint device, for example an endpoint device 109. As an example, the management application 116 can obtain a selection by rendering a user interface. The user interface can be a user interface screen containing a device details page element. The management application 116 can display one or more endpoint devices by rendering the one or more endpoint devices in a list on a device details page. In some cases, the device details page can be part of an operational group (OG) that has a remote support feature enabled in data store 113. Additionally, one or several of the endpoint devices displayed can have support for a remote support session 133 using the management application 116. To support can in this context mean that a particular endpoint device is registered and ready for remote support. Thus, the management application 116 can render a user interface that allows a user to click a link to select an endpoint device 109 that is ready for remote support and initiate a remote support session 133 for remote support on the endpoint device 109.

Also, the management application 116 can render a user interface element within the user interface that displays various buttons. The buttons can correspond to a particular remote support server 112a-112c. In this way, the management application 116 can programmatically select which type of remote support session to initiate depending on at least two scenarios.

In one example, if an endpoint device 109 is able to communicate with a remote support server 112 and access a remote support session 133, the management application 116 can display a button that when clicked can launch a new window to show the remote support session 133. In certain embodiments, a client device 106 could be restricted to this new window, with access from the client device 106 to other screens limited so that no other screens are accessible. In one other example, if an endpoint device 109 is able to access a remote support session 133 without communicating with a remote support server 112, the management application 116 can display another button that when clicked can launch a new window to show the remote support session 133.

Accordingly, the management application 116 can obtain a selection by a user clicking a button corresponding to a particular endpoint. Thus, a user on a client device 106 can send to the management application 116 a request to initiate a remote support session by clicking on a "Remote Management" button on a device details page.

Referring now to step 206, the management application 116 can determine a remoting capability of the endpoint device by obtaining a sample from the endpoint device. The sample can include a remoting agent status, a geographical location, a network connection status, and a UDID. Further, the remoting capability can be based on the presence of (or lack of) one or more remoting agent 149 installed on the endpoint device 109. The management application 116 can, in some cases, cause the determining of remoting capability to be performed by a management agent 146 installed on the endpoint. For example, the management application 116 can store a command in a command queue 119, the command when executed by a management agent 146 on the endpoint device 109 causes the management agent 146 to obtain a remoting agent status, a geographical location, a network connection status, and a UDID about an endpoint device 109. In some cases, the command causes management agent 146 to retrieve this information from device info 139 stored in data store 123.

The management application 116 can then move to step 209 and select a remote support server, for example, a remote support server 112. The management application 116 can for example select a remote support server 112 from at least one remote support server 112. In some cases, there can be multiple remote support servers 112a-112c, and the management application 116 will select a remote support server 112 from the plurality of remote support servers. The management application 116 can base the selecting of a remote support server on the remoting capability of the endpoint device as determined at step 206. The management application 116 can use various other algorithms and measurements to select the remote support server 112, including but not limited to those known in the art such as latency, service availability, protocol support, load balance, and the like. Management application 116 can use a latency, also known as the interval of time it takes for a remote support server 112 to receive and begin to respond to an API call. The management application 116 can also use a service availability which in this context means the status of a remote support server 112 availability to respond to an API call. In addition, the management application 116 can use a protocol support which in this context means an ability for a remote support server 112 to communicate to an endpoint device 109 using a remoting protocol, for example, Transport Layer Security (TLS)/Secure Sockets Layer (SSL) or Microsoft Remote Desktop Protocol (RDP). Management application 116 can also use a load balance which in this context means a distribution of a remote support session 133 workload between multiple remote support servers 112.

Following selecting a remote support server, the management application can then move to step 213, at which point the management application 116 can determine that execution of a remoting agent 149 is (or is not) required for the endpoint device 109 to participate in remote support session 133. In some cases, management application 116 can determine that execution of a remoting agent 149 is not required for endpoint device 109, at which point the management application 116 proceeds to step 219. This decision can be made if management application 116 determines endpoint device 109 is capable to establish a remote support session 133 with without using a remoting agent 149, such as by using a management agent 146 or other features/functionality of the endpoint device 109.

In other examples, the management application 116 may have selected a remote support server 112 at step 209 for which execution of a remoting agent 149 is required before a remote support session can be established between endpoint device 109 and remote support server 112. Management application 116 can also determine that a particular remoting agent 149 is present on endpoint device 109, and that remoting agent 149 can be used to facilitate a remote support session 133 with the selected remote support server 112. In any of these examples, management application 116 can proceed to step 216.

In another example, it is possible that a remote support session can be initiated without a remoting agent 149, and management application 116 can cause client device 106 to connect to the endpoint device 109 in other ways. Management application 116 can therefore initiate a remote support session 133 between a client device 106 and an endpoint device 109 without using a remoting agent 149. In some cases, the management application 116 can initiate a remote support session using a management agent 146 or by using remote support features of the endpoint device 109. In this case, management application 116 can launch a remote support session within a modal as part of a user interface element rendered by the management application 116. A modal in this context means a window that forces an administrator on a client device 106 to interact with the window before the administrator can go back to using the management application 116. In this example, the management application 116 can proceed to step 219.

At step 216, the management application 116 can cause one or more actions to be performed against an endpoint device 109. For example, management application 116 can cause a remoting agent 149 to be executed on the endpoint device 109 selected at step 203. The remoting agent 149 can be associated with the remote support server 112 selected at step 209. The execution of remoting agent 149 can be performed using a management agent 146 of the endpoint device 109. For example, the management application 116 can store a command to the command queue 119. The command, when executed by the management agent 146 on the endpoint device 109 causes the management agent 146 to execute remoting agent 149 giving remoting agent 149 information to allow a remote support session to be initiated between the endpoint device 109 and the remote support server 112.

Management application 116 can also check registration of the endpoint device 109 with a provisioning application 161 on remote support server 112. Management application 116 can obtain from remote support server 112 an eligibility status of endpoint device 109, including by making one or more API calls (as described above). In this context eligibility status means whether remote support server 112 is configured for remote support of the endpoint device 109.

Management application 116 can also provide a message to the endpoint device 109. The message causes the management agent 146 to retrieve the command from the command queue 119 and to execute the command. The message can be a ThirdPartyMessaging message. Management agent 146 on the endpoint device 109 can retrieve the message. The message causes the management agent 146 to retrieve the command from the command queue 119 and to execute the command. The management agent 146 can cause remoting agent 149 to be executed on endpoint device 109. The command, when executed by the management agent 146 on the endpoint device 109, causes the management agent 146 to execute a remoting agent 149 and causes the remoting agent 149 to communicate with a support application 164 on remote support server 112, allowing a remote support session to be initiated between the endpoint device 109 and the remote support server 112. Finally, the management application 116 receives from the management agent 146 an acknowledgement to the command.

In some cases, execution of a remoting agent on an endpoint device can involve attended operation of the endpoint device 109. In these cases, the management application 116 can obtain a user response in response to a prompt displayed on the endpoint device 109. In some other cases, an execution can involve unattended operation of the endpoint device 109. The management application 116 can provide a message to execute remoting agent 149. In some examples, the management application 116 can store a command to the command queue 119. The command, when executed by the management agent 146 on the endpoint device 109 causes the management agent 146 to execute a remoting agent 149. The command gives the remoting agent 149 information that allows a communication to be established between the endpoint device 109 and the remote support server 112. The endpoint device 109 can in these ways communicate with a remote support server 112 for a client device 106 to perform a remote support session 133 on endpoint device 109.

The management application 116 proceeds to step 219, where management application 116 initiates a remote support session 133. Management application 116 has at this point determined a remoting capability of the endpoint device 109 and selected a remote support server 112. Additionally, if a remoting agent 149 is required then management application 116 has caused remoting agent 149 to be executed. Management application 116 can provide any URLs or control data necessary to cause a particular client device 106 to connect to the remote support server 112. In some other cases, including when a remoting agent 149 is not required, the management application 116 can cause client device 106 to connect to the endpoint device 109 in other ways. The management application 116 can therefore initiate a remote support session 133 between a client device 106 and an endpoint device 109, including in some cases using a remote support server 112.

In cases of using a remote support server 112, the management application 116 can make a StartSession API call to support application 164 using API request parameters that will cause support application 164 to return control data about a remote support session 133. Support application 164 can, after verifying it has all the request parameters, return a uniform resource locator (URL), control data, or other types of data as a response. Upon receiving a response, management application 116 can cause the client device 106 or the client application 156 to open a new tab with this URL and thus establish a communication between the client device 106 and the remote support server 112. The client application 156 can in these ways communicate with a remote support server 112 and perform a remote support session 133 on endpoint device 109. Thereafter, the process ends.

Figure 2B:
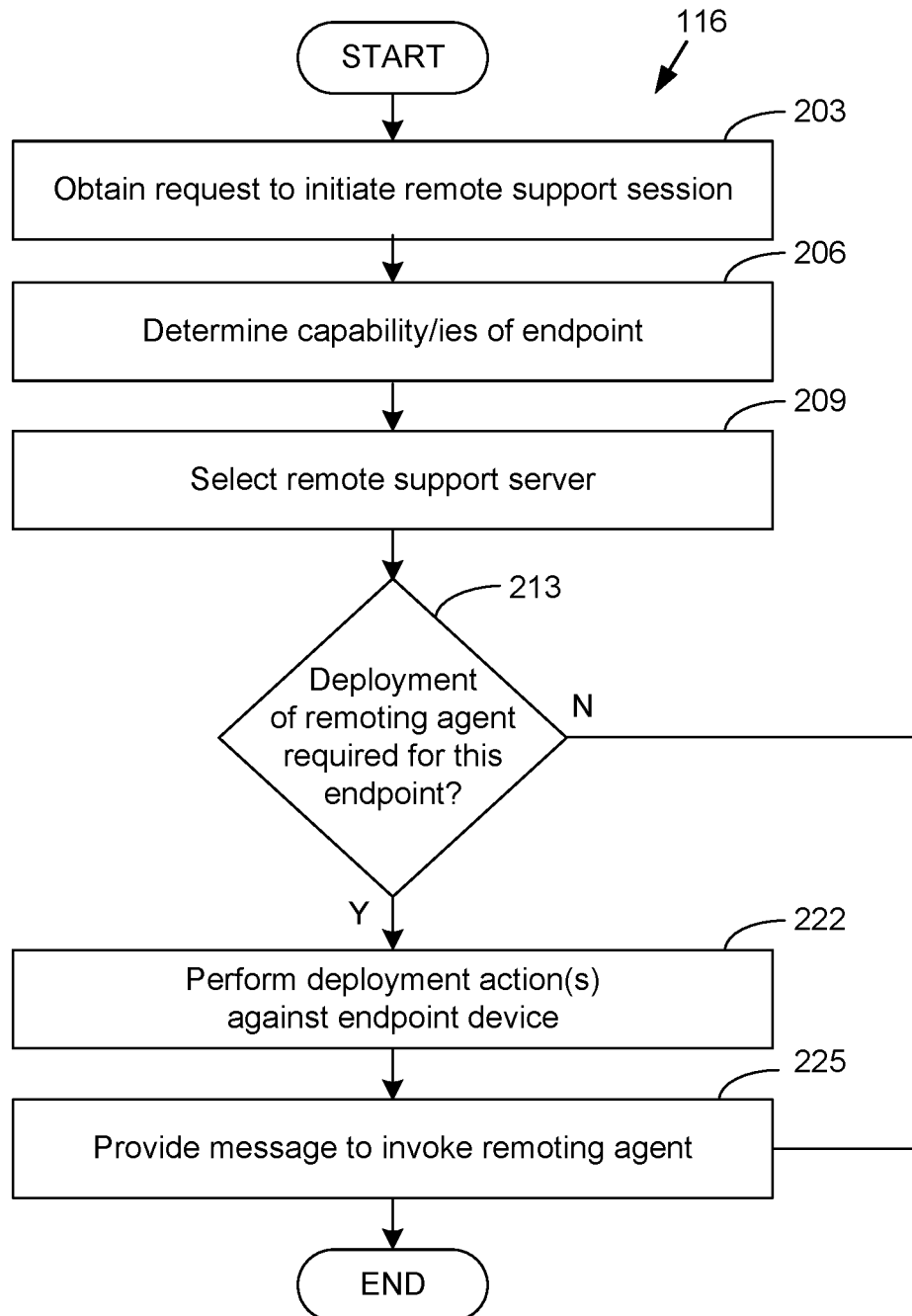
FIG. 2B is a flowchart illustrating examples of functionality implemented as portions of a management application executed in a computing environment in the networked environment of FIG. 1 according to various embodiments of the present disclosure.

With reference to FIG. 2B, shown is a flowchart that provides an example of a portion of the operation of the computing environment 103. In particular, FIG. 2B provides an example of the management application 116 facilitating a remote support session between an endpoint device and a client device by performing a deployment action on an endpoint device. Additionally, the flowchart of FIG. 2B can be viewed as depicting an example of steps of a method implemented in the management application 116.

Beginning with step 203, the management application 116 can obtain a request to initiate a remote support session from client application 156 running on a client device 106. The request can include selection of an endpoint device 109 from a list of endpoint devices as previously described herein. The management application 116 can display a button that when clicked can launch a new window to show the remote support session 133, including when endpoint device 109 is able to access a remote support session 133 by communicating with a remote support server 112.

Accordingly, the management application 116 can obtain a selection by a user clicking a button corresponding to a particular endpoint. Thus, a user on a client device 106 can send to management application 116 a request to initiate a remote support session by clicking on a "Remote Management" button on a device details page.

Referring now to step 206, the management application 116 can determine a remoting capability of the endpoint device by causing a management agent 146 installed on the endpoint device 109 to obtain a sample from the endpoint device. The sample can include a remoting agent status, which in this context means the presence of (or lack of) remoting agent 149 on the endpoint device 109. For example, the management application 116 can store a command in a command queue 119, the command when executed by a management agent 146 on the endpoint device 109 causes the management agent 146 to obtain the remoting agent status. In some cases, the command causes management agent 146 to obtain the remoting agent status from device info 139 stored in data store 123.

The management application 116 can then move to step 209 and select a remote support server, for example a remote support server 112. The management application 116 can for example select a remote support server 112 from at least one remote support server 112. In some cases, there can be multiple remote support servers 112a-112c, and the management application 116 will select a remote support server 112 from the plurality of remote support servers. The management application 116 can base the selecting of a remote support server on the remoting capability of the endpoint device as determined at step 206.

Following selecting a remote support server 112, the management application can then move to step 213, at which point the management application 116 can determine that a deployment of a remoting agent is (or is not) required for this endpoint. In some cases, the management application 116 can determine that deployment of a remoting agent is not required for this endpoint, at which point the management application 116 proceeds to step 225. This decision can be made for example if there is a remoting agent 149 present on endpoint device 109 for which the remote support server 112 selected at step 209 is compatible.

In other examples, management application 116 may have determined a remote support server 112 at step 209 for which deployment of a remoting agent 149 is required before a remote support session can be established between endpoint device 109 and remote support server 112. The management application 116 can also determine that a particular remoting agent is present on endpoint device 109, and that the remoting agent is not compatible with the selected remote support server 112 and thus deployment of a different remoting agent 149 is required. In any of these examples, management application 116 can proceed to step 222.

At step 222, the management application 116 can perform a deployment action against the endpoint device. For example, the deployment action can be installing a remoting agent on the endpoint device. The deployment action can also be performed using a management agent 146 of the endpoint device 109. In some examples, the deployment action can include several actions. The management application 116 can store a command in a command queue 119, the command when executed by a management agent 146 on the endpoint device 109 causing the management agent 146 to install and configure remoting agent 149 on an endpoint device 109. In some cases, a deployment action may involve attended operation of the endpoint device 109. In these cases, the management application 116 can obtain a user response in response to a prompt displayed on the endpoint device 109. In some other cases, a deployment action may involve unattended operation of the endpoint device 109.

As another example of a deployment action, management application 116 can generate a command to cause endpoint device 109, or in some cases management agent 146 or remoting agent 149, to register endpoint device 109 with remote support server 112. The command can cause endpoint device 109 to call an API on provisioning application 161 to register endpoint device 109 with remote support server 112.

The management application 116 proceeds to step 225, where management application 116 causes remoting agent 149 to be executed. In some examples, the management application 116 stores a command in a command queue 119 the command when executed by a management agent 146 on the endpoint device 109 causing the management agent 146 to execute a remoting agent 149 giving the remoting agent necessary information to reach out to remote support server 112. The management application 116 can also provide a message to the management agent 146, the message causing the management agent 146 to retrieve the command from command queue 119 and to execute the command. In this way, management application 116 can deploy a remoting agent 149 and cause the remoting agent 149 to be executed, thus facilitating a remote support session 133 between a client device 106, an endpoint device 109, and a remote support server 112. Thereafter, the process ends.

The flowcharts of FIGS. 2A-2B show examples of the functionality and operation of implementations of components described herein. The components of the networked environment 100 described herein can be embodied in hardware, software, or a combination of hardware and software. If embodied in software, each step in the flowcharts of FIGS. 2A-2B can represent a module or a portion of code that comprises instructions to implement the specified logical functions. The instructions can be embodied in the form of source code that comprises human-readable statements written in a programming language or machine code that comprises machine instructions recognizable by a suitable execution system, such as a processor in a computer system or other system. If embodied in hardware, each step can represent a circuit or a number of interconnected circuits that implement the specified logical functions.

Although the flowcharts show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

Figure 3A:
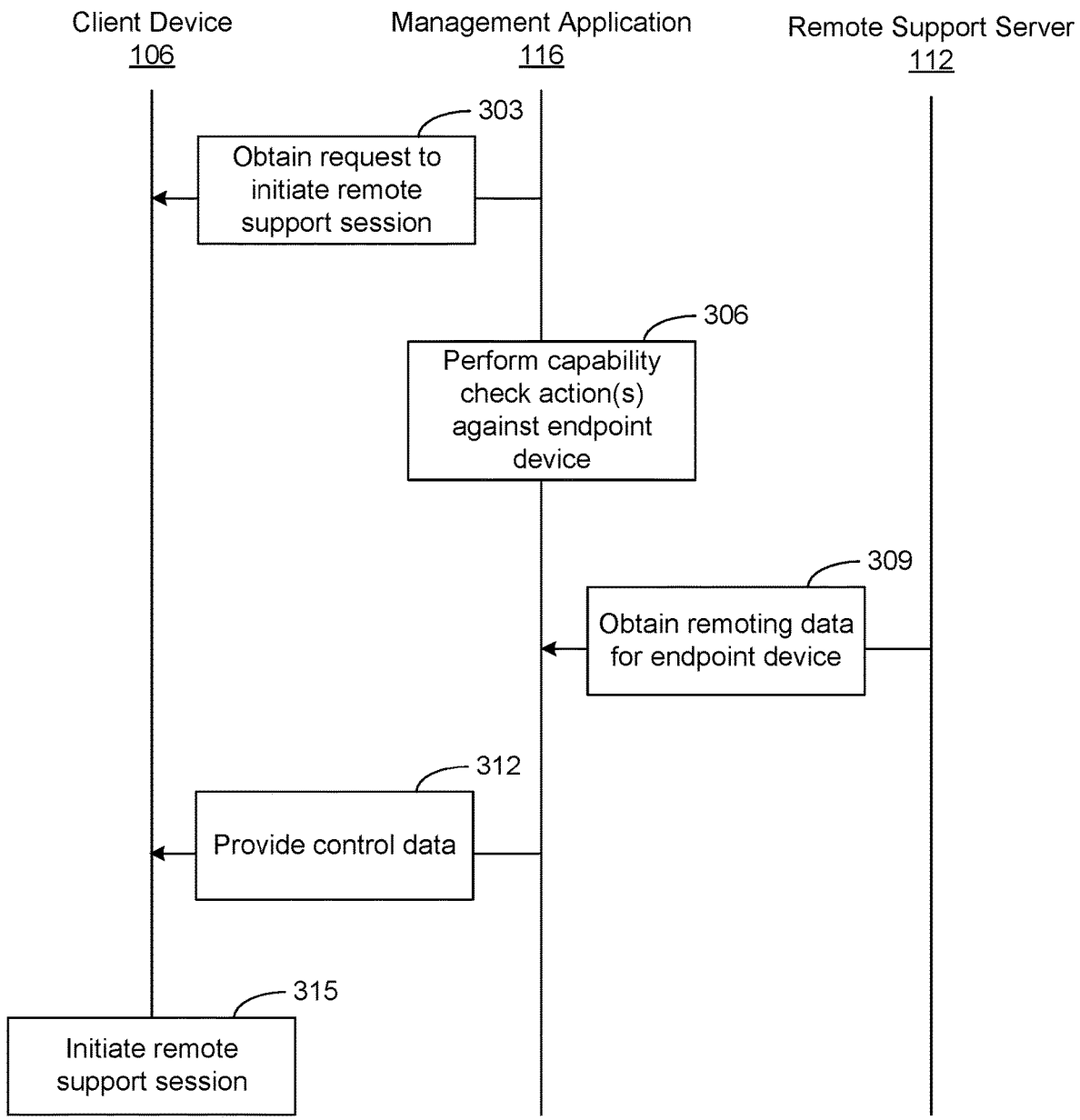
FIGS. 3A-3C are sequence diagrams illustrating examples of interaction between a client device, a management application, a remote support server, and a management agent in the networked environment of FIG. 1 according to various embodiments of the present disclosure.
Figure 3B:
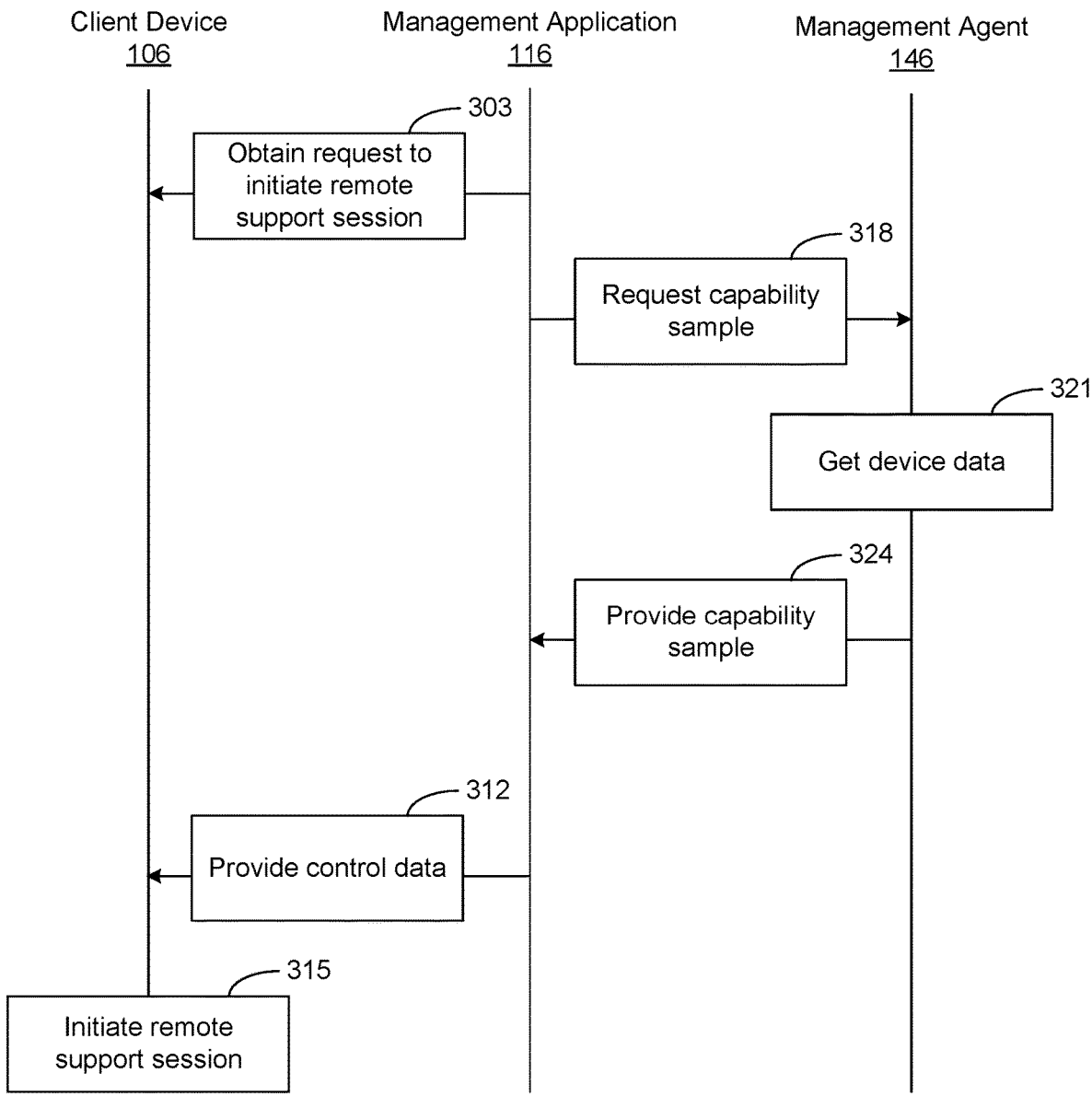
Figure 3C:
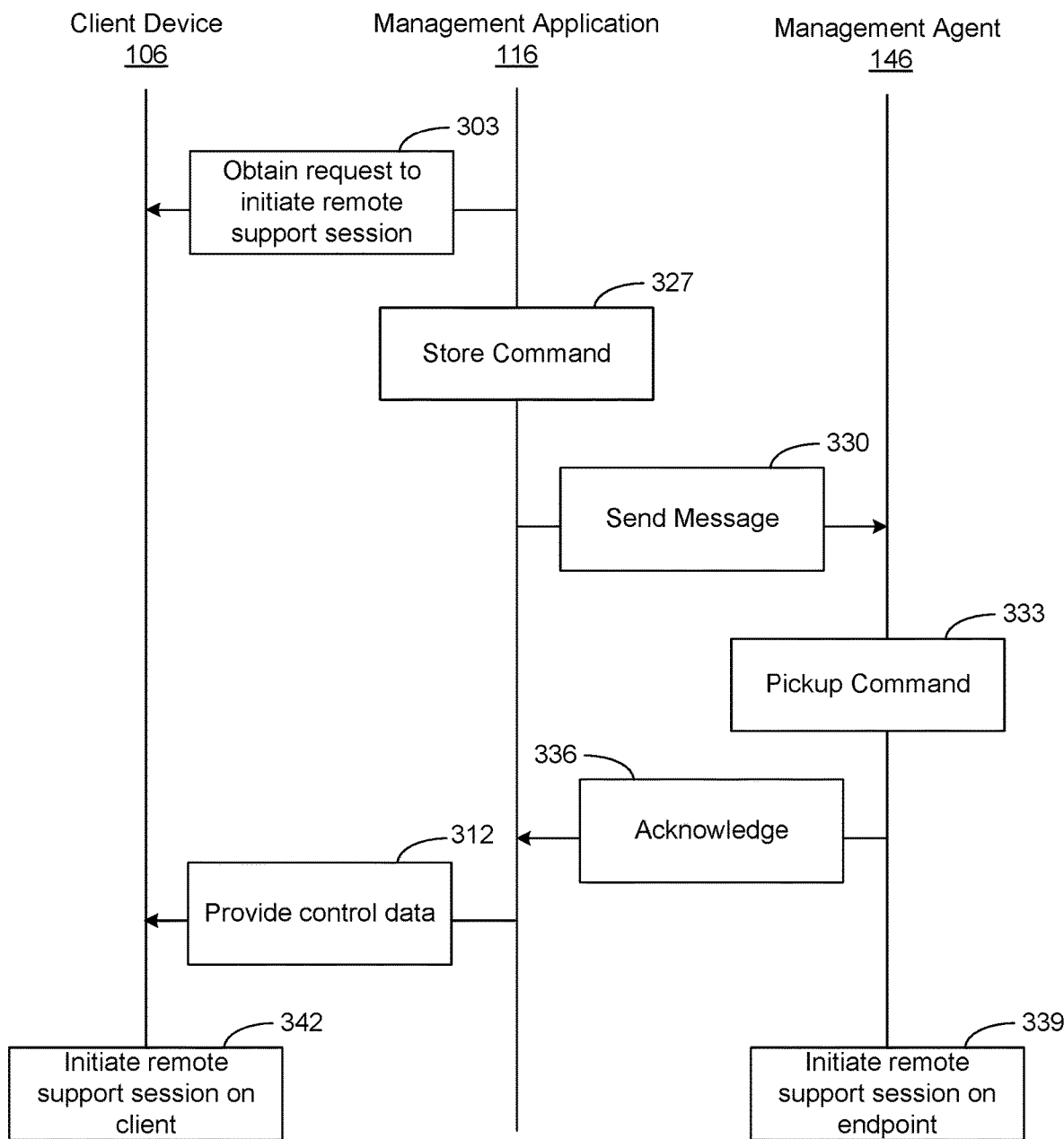

With reference to FIGS. 3A-3C, shown are sequence diagrams illustrating an example of interactions of components in the networked environment 100. The sequence diagrams of FIGS. 3A-3C illustrate an example of the management application 116 initiating a remote support session 133.

Beginning with step 303, the management application 116 can obtain from a client device 106 a request to initiate a remote support session to an endpoint device, the request including the selection of an endpoint device. In some examples, the endpoint can be selected by clicking a link representing an endpoint device 109.

At step 306, the management application 116 can check the capability of the selected endpoint. The capability check can include determining the status of a product authorization or determining various information about the device including manufacturer or make/model of the endpoint device 109. The management application 116 can use this information to select which remote support server 112 to use for a remote support session 133. For example, if a product authorization stored in data store 113 indicates an authorization to perform remote support using an AETHERPAL® remote support server, management application 116 can select remote support server 112. Additionally, management application 116 can select remote support server 112 based on other information stored in the data store 113. In some examples, management application 116 can render a user interface that obtains an entry of a selected, preferred, or default remote support server 112, including by obtaining an entry associated with an enterprise (or tenant).

As shown at step 309, the management application 116 can obtain remoting data for the selected endpoint device from remote support server 112. In some examples, the remoting data can include eligibility information for an endpoint device 109. The management application 116 can obtain remoting data for example by making a StartSession API call to support application 164 using API request parameters that will cause support application 164 to return control data about a remote support session 133. The management application 116 can receive from support application 164 a uniform resource locator (URL) as a response.

Referring to step 312, management application 116 can provide control data to client device 106. Control data can include a uniform resource locator (URL) that management application 116 received from making a StartSession API call to remote support server 112. The URL allows client device 106 to communicate with a remote support server 112 and perform a remote support session 133 on endpoint device 109.

As shown in step 315, client device 106 is able to initiate a remote support session. In one example, management application 116 can cause the client device 106 to connect to the remote support server 112 by providing the URL to the client device 106 as control data. Management application 116 can cause client device 106, or client application 156 to open a new tab with this URL and thus establish a communication between the client device 106 and the remote support server 112. Thereafter, the process can end.

Referring next to FIG. 3B, shown is another example sequence involving another example capability check for endpoint device 109. In FIG. 3B management application 116 can check the capability of the selected endpoint by contacting management agent 146. Beginning with step 303, the management application 116 can obtain from a client device 106 a request to initiate a remote support session to an endpoint device, the request including the selection of an endpoint device. In some examples, the endpoint can be selected by clicking a link representing an endpoint device 109.

At step 318, the management application 116 can request the management agent 146 to perform a capability sample. A capability sample can indicate for example what mobile device features, such as remoting features, are available on the endpoint device 109. The capability sample can be a remoting agent status, a geographical location, a network connection status, or a Unique Device Identifier (UDID). The capability sample can be obtained by a management agent 146 on endpoint device 109. As one example, the management application 116 can store one or more commands to the command queue 119 that can cause management agent 146 to obtain a capability sample. The management agent 146 can periodically query the command queue 119 to determine whether the management application 116 has instructed the management agent 146 to obtain a capability sample for capabilities of endpoint device 109.

Management agent 146 can retrieve at step 321 various device data, including data to identify device features or define the capability of an endpoint device 109 to participate in a remote support session 133 with a remote support server 112. Management agent 146 can obtain the device data from device info 139, or other data stored in the data store 123 of endpoint device 109. Device info 139 can include a unique device identifier (UDID), which identifies an endpoint device 109 that is enrolled with the management application 116 as a managed device. Device info 139 can also include a serial number, a hardware identification number, a media access control (MAC) address or International Mobile Equipment Identity (IMEI) number of a network card. Thus, at step 324 the management agent 146 provides the device data as a capability sample to management application 116. As a result, the management application 116 obtains a variety of data regarding the remoting capabilities of the endpoint device 109.

Management application 116 can determine the remoting capability of the endpoint device 109 based on the sample provided by management agent 146 at step 324. The management application 116 can use this and other data to select a remote support server 112 that is capable of creating a remote support session 133 for an endpoint device 109.

Thus, at step 312, management application 116 can provide necessary control data to client device 106. The management application 116 can provide control data to client device 106. Control data can include a uniform resource locator (URL) that management application 116 received from making a StartSession API call to remote support server 112. The URL allows client device 106 to communicate with a remote support server 112 and perform a remote support session 133 on endpoint device 109.

As shown in step 315, the client device 106 is able to initiate a remote support session. In one example, the management application 116 can cause the client device 106 to connect to the remote support server 112 by providing the URL to the client device 106 as control data. The management application 116 can cause client device 106, or client application 156, to open a new tab with this URL and thus establish a communication between the client device 106 and the remote support server 112. Thereafter, the process can end.

Next, in FIG. 3C, shown is an example of a management application 116 causing a remoting agent to be executed on an endpoint. Beginning with step 303, the management application 116 can obtain from a client device 106 a request to initiate a remote support session to an endpoint device, the request including the selection of an endpoint device. In some examples, the endpoint can be selected by clicking a link representing an endpoint device 109.

At 327, management application 116 stores a command. Management application 116 places a command in a command queue 119 associated with an endpoint device 109 that, when retrieved and executed by the endpoint device 109, causes the endpoint device 109 to execute a remoting agent 149. The command also gives the remoting agent 149 information that allows a remote support session to be initiated between the endpoint device 109 and the remote support server 112.

Next, at 330, management application 116 sends a message, for example an AWCM message, to management agent 146. The message causes the management agent 146 to retrieve the command from the command queue 119 and to execute the command. After receiving the message, at step 333 management agent 146 retrieves the command from the command queue 119. Management agent 146 performs the command on the endpoint device 109. In some examples, the message is a push notification that can cause endpoint device 109 to query the command queue 119.

The endpoint device 109 can execute commands, including commands to cause an agent to be executed, cause an agent to be installed, and/or to configure one or more agents. As mentioned earlier, endpoint device 109 can execute a management agent 146. One example of the functionality of a management agent 146 is to execute commands on the endpoint device 109. The management agent 146 can be an application or service that can communicate with the management application 116 to administer the endpoint device 109. The management agent 146 can be installed with elevated or administrative privileges and install remoting agents, verify configuration of remoting agents, install configuration files, cause remoting agents to be executed, or perform other actions to administer the endpoint device 109 on behalf of the management application 116. In the context of this disclosure, the management agent 146 can facilitate the installation of remoting agent 149 on the endpoint device 109 on behalf of the management application 116. The management agent 146 can also cause a remoting agent 149 to be executed on the endpoint device 109.

The management agent 146 can obtain messages and/or commands from command queue 119 to determine whether management application 116 has requested one or more actions to be performed against endpoint device 109. To this end, the management agent 146 can periodically query the command queue 119 to determine whether the management application 116 has instructed the management agent 146 to take any actions upon an endpoint device 109.

As an example of causing a remoting agent to be executed, the management application 116 can store a command in the command queue 119 and transmit the command to an endpoint device 109 telling the endpoint device 109 to cause a remoting agent 149 to be executed using particular configuration settings or configuration commands. The management agent 146 can access the command queue 119 and execute a command to cause the remoting agent 149 to be executed. The command, when executed, causes the endpoint device 109 to execute the remoting agent 149 and gives the remoting agent 149 information that allows a remote support session 133 between the endpoint device 109 and the remote support server 112.

For example, the command queue 119 can be used to cause a remoting agent 149 to be executed on endpoint device 109, causing remoting agent 149 to connect to remote support server 112. In one example, management application 116 can store a command to the command queue 119. The command, when executed by the management agent 146 on the endpoint device 109 causes the management agent 146 to execute a remoting agent 149 giving the remoting agent 149 information that allows a communication to be established between the endpoint device 109 and the remote support server 112. The command can be a ThirdPartyRemoteManagement command, a RemoteManagement command, or other command.

The management application 116 can also provide a message to the endpoint device 109. The message causes the management agent 146 to retrieve the command from the command queue 119 and to execute the command. In some cases, the message is an AirWatch Cloud Messaging (AWCM) message, a ThirdPartyMessaging message, or other message.

The command, when executed by the management agent 146 on the endpoint device 109 causes the management agent 146 to execute a remoting agent 149 and causes the remoting agent 149 to communicate with a support application 164 on remote support server 112, allowing a remote support session to be initiated between the endpoint device 109 and the remote support server 112.

Then, at step 336, the management agent 146 sends an acknowledgement to management application 116. In this way, management application 116 receives from the management agent 146 an acknowledgement to the command. After receiving the acknowledgement, management application 116 at step 312 provides control data to client device 106. As discussed herein, control data can include a session map, a user map, a role map, and/or other data. In some embodiments, control data can include data to facilitate processes for user authentication, user authorization, and remote control of endpoint devices. As shown at step 339, the management agent 146 is able to initiate a remote support session on an endpoint. The management application 116 can make a StartSession API call to remote support server 112. The management application 116 can identify a user id of a user associated with the management application 116 by querying user data 136 stored in data store 113. Then, using a mapping stored in data store 113, the management application 116 can send a ThirdPartyRM UserID (instead of the user id of the user associated with the management application 116) as all of or some part of a StartSession API call to remote support server 112. Following a StartSession API call, management application 116 can receive from the remote support server 112 a URL that allows client device 106 to communicate with a remote support server 112 and perform a remote support session 133 on endpoint device 109. Finally, management application 116 causes a remoting agent 149 to be executed on the endpoint device 109. The execution of remoting agent 149 can be performed using a management agent 146 of the endpoint device 109. For example, the management application 116 can store a command to the command queue 119. The command, when executed by the management agent 146 on the endpoint device 109 causes the management agent 146 and allows a remote support session 133 to be initiated between the endpoint device 109 and the remote support server 112.

As shown in step 342, client device 106 is able to initiate a remote support session. Management application 116 causes client device 106 to connect to remote support server 112 by providing the URL to client device 106. The management application 116 causes the client device 106, or client application 156, to open a new tab with this URL and thus establishes a communication between the client device 106 and the remote support server 112. Thereafter, the process can end.

Thus, as described above, the management application 116 can communicate with a client device 106 and an endpoint device 109 (including in some examples a management agent 146 running on an endpoint device 109) to initiate a remote support session 133 between a client device 106 and an endpoint device 109 using a remote support server 112.

The computing environment 103, remote support server 112, endpoint device 109, client device 106, and other components described herein can each include at least one processing circuit. Such a processing circuit can comprise one or more processors and one or more storage devices that are coupled to a local interface. The local interface can comprise a data bus with an accompanying address/control bus.

A storage device for a processing circuit can store data and components that are executable by the one or more processors of the processing circuit. In some examples, the management application 116, the client application 156, and the management agent 146 can be stored in one or more storage devices and be executable by one or more processors. Also, the data store 113 and the data store 123 can be located in the one or more storage devices.

The management application 116, remote support server 112, endpoint device 109, client device 106, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or instructions can be embodied in any non-transitory computer-readable medium for use by or in connection with an instruction execution system such as, for example, a processor in a computer system or other system. Such a computer-readable medium can contain, store, and maintain the software or instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A non-transitory computer-readable medium storing a plurality of instructions executable by a computing device, the plurality of instructions being configured to cause the computing device to at least:
   obtain a request to initiate a remote support session, the request comprising a selection of an endpoint device for remote support;
   determine a remoting capability of the endpoint device by obtaining a sample from the endpoint device;
   obtain an eligibility status of the endpoint device from at least one of a plurality of remote support servers;
   select, based at least on the remoting capability of the endpoint device, a remote support server from the at least one of a plurality of remote support servers; and
   provide endpoint control data to the endpoint device, the endpoint control data causing the endpoint device to communicate with the remote support server.

2. The non-transitory computer-readable medium of claim 1, wherein the instructions are further configured to cause the computing device to at least generate a command to cause installation of a remoting agent on the endpoint device.

3. The non-transitory computer-readable medium of claim 1, wherein the instructions are further configured to cause the computing device to at least:
   provide client control data to a client device, the client control data causing the client device to communicate with a remote support server allowing a remote support session to be conducted.

4. The non-transitory computer-readable medium of claim 3, wherein the client control data is provided to a client device by:
   creating a user map based on at least one of user identifier, role ID, setup CN, location, unique device identifier (UDID), Common Name (CN), and hostname/uniform resource locator (URL);
   providing the user map to the remote support server; and
   wherein the client control data further comprises a URL based on remoting control data received from the remote support server in response to providing the user map to the remote support server.

5. The non-transitory computer-readable medium of claim 1, wherein the endpoint control data is provided to the endpoint device by:
   generating a command to cause execution of a remoting agent on the endpoint device;
   storing the command in a command queue, the command when executed by a management agent on the endpoint device causing the management agent to execute the remoting agent; and
   providing a message to the management agent, the message causing the management agent to retrieve the command and execute the command.

6. The non-transitory computer-readable medium of claim 1, wherein the instructions are further configured to cause the computing device to at least:
   perform, using a management agent, a deployment action against the endpoint device, the deployment action generating a command to cause a remoting agent on the endpoint device to register the endpoint device with at least one remote support server.

7. The non-transitory computer-readable medium of claim 1, wherein the sample is obtained from the endpoint device by:
   generating a command to cause a management agent on the endpoint device to obtain from the endpoint device at least one of a product authorization, a remoting agent status, a geographical location, a network connection status, or a UDID or other device identifier.

8. A system, comprising:
   a computing device; and
   a management application executable by the computing device, wherein the management application, when executed by the computing device, is configured to cause the computing device to at least:
      obtain a request to initiate a remote support session, the request comprising a selection of an endpoint device for remote support;
      determine a remoting capability of the endpoint device by obtaining a sample from the endpoint device;
      obtain an eligibility status of the endpoint device from at least one of a plurality of remote support servers;

select, based at least on the remoting capability of the endpoint device, a remote support server from the at least one of a plurality of remote support servers; and provide endpoint control data to the endpoint device, the endpoint control data causing the endpoint device to communicate with the remote support server.

9. The system of claim 8, wherein the management application is further configured to cause the computing device to generate a command to cause installation of a remoting agent on the endpoint device.

10. The system of claim 8, wherein the management application is further configured to cause the computing device to:

provide client control data to a client device, the client control data causing the client device to communicate with a remote support server allowing a remote support session to be conducted.

11. The system of claim 10, wherein the client control data is provided to the client device by:

creating a user map based on at least one of user identifier, role ID, setup CN, a location, UDID, Common Name (CN), hostname, and URL;

providing the user map to the remote support server; and wherein the client control data further comprises a URL based on remoting control data received from the remote support server in response to providing the user map to the remote support server.

12. The system of claim 8, wherein the endpoint control data is provided to the endpoint device by:

generating a command to cause execution of a remoting agent on the endpoint device;

storing the command in a command queue, the command when executed by a management agent on the endpoint device causing the management agent to execute the remoting agent; and providing a message to the management agent, the message causing the management agent to retrieve the command and execute the command.

13. The system of claim 8, wherein the management application is further configured to cause the computing device to at least:

perform a deployment action against the endpoint device, the deployment action generating a command to cause a remoting agent on the endpoint device to register the endpoint device with at least one remote support server.

14. The system of claim 8, wherein the management application is further configured to cause the computing device to at least:

render a user interface that represents at least one remote support server; and obtain a plurality of control data entries, wherein the plurality of control data entries comprise at least a hostname and a port number.

15. The system of claim 8, wherein the sample is obtained from the endpoint device by:

generating a command to cause a management agent on the endpoint device to obtain from the endpoint device at least one of a product authorization, a remoting agent status, a geographical location, a network connection status, or a UDID or other device identifier.

16. A method, comprising:

obtaining a request to initiate a remote support session, the request comprising a selection of an endpoint device for remote support;

determining a remoting capability of the endpoint device by obtaining a sample from the endpoint device;

obtaining an eligibility status of the endpoint device from at least one of a plurality of remote support servers;

selecting, based at least on the remoting capability of the endpoint device, a remote support server from the at least one of a plurality of remote support servers;

providing endpoint control data to the endpoint device, the endpoint control data causing the endpoint device to communicate with the remote support server; and providing client control data to a client device, the client control data causing the client device to communicate with a remote support server allowing a remote support session to be conducted.

17. The method of claim 16, wherein the client control data is provided to the client device by:

creating a user map based on at least one of user identifier, role id, setup CN, a location, UDID, CN, hostname, and URL;

providing the user map to the remote support server; and wherein the client control data further comprises a URL based on remoting control data received from the remote support server in response to providing the user map to the remote support server.

18. The method of claim 16 further comprising generating a command to cause installation of a remoting agent on the endpoint device.

19. The method of claim 16 wherein the endpoint control data is provided to the endpoint device by:

generating a command to cause execution of a remoting agent on the endpoint device;

storing, in a command queue, the command when executed by a management agent on the endpoint device causing the management agent to execute the remoting agent; and providing, to a management agent, a message causing the management agent to retrieve the command and execute the command, the command when executed by the management agent causing the management agent to communicate with the remote support server.

20. The method of claim 16 wherein obtaining a sample from the endpoint device further comprises:

generating a command to cause a management agent on the endpoint device to obtain from the endpoint device at least one of a product authorization, a remoting agent status, a geographical location, a network connection status, or a UDID or other device identifier.

* * * * *